Patented Mar. 16, 1937

2,073,853

UNITED STATES PATENT OFFICE 2,073,853

CELLULOSE ESTERS AND PRODUCTION OF SAME

Ferdinand Schulze, Waynesboro, Va., assignor, by mesne assignments, to E. I. du Pont de Nemours & Company, Wilmington, Del., a corporation of Delaware No Drawing. Application May 15, 1936
Serial No. 79,959

7 Claims. (Cl. 260—102)

This invention is concerned with the preparation of a solid cellulose acetate of relatively good heat and hydrolytic stability and which is capable of yielding solutions and structures such as films that are substantially free from haze. For convenience this type of cellulose acetate will be referred to as "haze-free cellulose acetate".

In the use of cellulose acetate for the production of laminated safety glass, of photographic film, and the like, it is extremely important that the cellulose acetate be free from haze and dust particles, and that it be possessed of a relatively high hydrolytic and heat stability which is capable, for instance, of withstanding heat from intense sunlight or a cinema projector. In the operation of known processes for preparing cellulose acetate upon a commercial scale, however, difficulty has been experienced from the cellulose acetate produced yielding a solution which has a somewhat opalescent hazy appearance that in turn is imparted to film made therefrom, and from the cellulose acetate having in many cases poor heat and hydrolytic stability.

Various explanations and remedies for the haze of cellulose acetate solutions have been advanced in the past. In general, the explanations have attributed the cause to three possible sources; namely: the presence either of unacetylated fibers, or of cellulose acetates of lower and higher combined acetic acid, or of mineral salts of iron, copper, and the like. In the case of unacetylated fibers, the difficulty should be overcome by removal of the fibers by effective filtration. Extensive filtering tests, however, indicate that while in some cases the appearance of the dope of the cellulose acetate is improved, still in others no apparent improvement results. If, however, the haze is caused by the presence of cellulose acetate of lower or higher combined acetic acid, removal of the same should improve the clarity of the cellulose acetate. Proceeding on this basis, a method of purification has been proposed consisting of fractionally precipitating or crystallizing cellulose acetate from a suitable solvent. By this procedure the impurities that lower the clarity presumably remain in solution to a certain extent and are thereby removed. A somewhat similar method consists of selectively extracting cellulose acetate with ether or like solvents which presumably selectively extract the impurities without dissolution of the main portion of the cellulose acetate. Another method, directed along these same lines, consists of grinding the cellulose acetate for a short time and then passing it through a sieve of appropriate mesh. The coarser cellulose acetate particles, which are substantially uncontaminated, are thus separated from the finer particles which contain most of the impurities.

On the other hand, some authorities have attributed the haze to mineral matter introduced either from the iron, copper, or like metallic containers used in the process, or from reagents added during the preparation of the cellulose acetate. It has therefore been proposed to remove these metallic salts by electrolyzing the cellulose acetate in a suitable conducting solution whereby the dissolved metallic salts are readily removed and the cellulose acetate bleached to a certain extent. Alternately, the metallic salts have been dissolved out by treatment of the cellulose acetate with hydrochloric acid.

The frequently poor hydrolytic and heat stability of cellulose acetate has been attributed by most authorities to the presence either of sulfoesters formed during the acetylation of the cellulose or to slight traces of free acetic acid in the solid cellulose acetate. A multiplicity of methods for removal of the sulfoesters have been proposed. It was early suggested that the sulfoesters be eliminated while the cellulose acetate is still a gummy solution by a process consisting of neutralizing the acid and then heating with water at 60–100° C. until a stable product is obtained. Later, it was proposed to remove the sulfoesters by subjecting the cellulose acetate flake to the action of boiling water at superatmospheric pressure for a suitable period of time. Still later, it was suggested that the sulfoesters be eliminated by subjecting the cellulose acetate in the presence of water to the action of sulfuric acid, sodium bisulfate or like dilute organic or inorganic acids. Recently, it was proposed to remove the sulfoesters by a process consisting of drying the cellulose acetate, then digesting it with water at a temperature of approximately 100° C., and finally washing it with boiling water. More recently, it has been proposed to eliminate the sulfoesters by a process consisting of first neutralizing most but preferably not all the sulfuric acid catalyst with a weak solution of sodium, potassium, and ammonium carbonates or bicarbonates, and then treating the cellulose acetate with an atmosphere of steam. Finally, it was suggested to treat the cellulose acetate with acetic, propionic, and/or butyric acid and an organic non-solvent in order to remove the sulfoesters.

One object of the invention pertains to the production of cellulose acetate which can be fabricated into haze-products such as films and the like.

It is a further object of the present invention to furnish a simplified and inexpensive procedure for improving not only heat stability and hydrolytic stability, but also the clarity and haze properties of cellulose acetate.

Another object of the present invention is to produce a cellulose acetate laminated safety glass which is substantially free from haze.

Still another object of the present invention is to produce a cellulose acetate photographic film which has good hydrolytic and heat stability and is substantially free from haze.

I have now found that one of the primary causes of haze is the presence of ultra-microscopic material in the water used for washing the cellulose acetate, which particles are absorbed by the cellulose acetate. This is most surprising and unexpected when it is realized that the water commonly used for washing satisfies all of the ordinary standards for clarity. Thus, for example, washing cellulose acetate with a sparkling, clear water having an A. P. H. A. (American Public Health Association "Standard Methods of Water Analysis", 7th Edition, 1933, published by the Association) turbidity as low as 0.9, produces an inferior cellulose acetate having a turbidity of 150–300 and yielding hazy solutions from which haze free film cannot be satisfactorily obtained. I have now found that a substantially haze free cellulose acetate can be prepared by the simple expedient of washing the cellulose acetate, prepared according to the usual practice, with water which has been specially clarified. In the preferred embodiment of the invention water having an A. P. H. A. turbidity as low as 0.9 and sparkling clear to the eye is treated with 6–12 parts per million of alum (aluminum sulfate) and then is filtered through a 30 inch layer of sand. The filtered water has an A. P. H. A. turbidity of 0.01–.30 and when utilized for washing the acetic acid from the cellulose acetate, produces a substantially haze free acetate. Such water, to the best of my knowledge, has not been available heretofore, nor has it been known that water of such clarity would exert such a profound effect on the haze property of the cellulose acetate. It is preferred that the cellulose acetate is washed when freshly precipitated, that is cellulose acetate which has not been previously washed with water of ordinary clarity, however, cellulose acetate which has previously been washed with water of ordinary clarity may be considerably improved by washing the same with water having a turbidity not in excess of 0.30 in accordance with this invention.

In my experiments I have found further that the improvement in haze does not automatically give an improvement in heat and hydrolytic stability. It has now been discovered that both a substantial improvement in freedom from haze and also a notable increase in heat and hydrolytic stability may be obtained by washing with a highly clarified water having an A. P. H. A. turbidity of 0.30 or lower and having a pH of 7–9 and an alkalinity consisting of 85 to 120–150 parts per million of magnesium, calcium or other alkaline earth carbonates. Preferably, I add to the water prior to the clarification thereof a sufficient quantity of magnesium or calcium carbonate, dissolved as the bicarbonate, to give the filtered water a pH of 7–9 and an alkalinity of 100–120 parts per million, expressed as calcium carbonate.

It has even further been found that cellulose acetate containing approximately 0.01% magnesium, calcium or other alkaline earth carbonates introduced by washing the cellulose acetate with a water of the above description, or by blending the solid alkaline earth carbonates with the cellulose acetate or by any other suitable method, is substantially free from haze of the described character and in addition, has an improved hydrolytic and heat stability.

In order to promote a better understanding, specific examples of the procedure of my invention will now be given, but it will be understood that they are in no way limitative.

*Example I*

Nine (9) parts per million of alum are added to a sparkling, clear water having an A. P. H. A. turbidity of 0.9 or slightly higher, a pH of 8–9, and an alkalinity of 80–100 parts per million, expressed as calcium carbonate and the treated water is filtered through a pressure type filter containing a 30 inch layer of sand to yield a water having an A. P. H. A. turbidity of 0.01 to 0.30. Cellulose acetate is prepared by reacting cotton linters with acetic anhydride in glacial acetic acid and in the presence of sulfuric acid catalyst, followed by hydrolyzing to a desired acetone solubility, the cellulose acetate being precipitated from the acetic acid solution in the usual fashion, e. g. by the addition of water. The freshly precipitated cellulose acetate from which the excess acetic acid has been removed by suitable means, and which is substantially free from unacetylated fibres and metallic impurities, is washed for a period of 15–40 hours with the water clarified as described. The resulting cellulose acetate thus freed of acetic acid and dried has a turbidity of 70–120, a hydrolytic stability of 25–50, and a heat stability of 200, and yields an acetone solution of brilliant clarity which produces haze free film admirably suited for safety glass and photographic purposes. The use of a highly clarified water is a distinct advance in the art inasmuch as a haze free cellulose acetate is produced simply by washing.

*Example II*

A procedure similar to that described in Example I is followed except that prior to the sand-alum filtration, a small amount of calcium carbonate, for example 20–30 parts per million of water, is added to the water through which a regulated stream of carbon dioxide is bubbled. The treated water has an A. P. H. A. turbidity of 0.04 to 0.30, a pH of 7–9, and an alkalinity of 100–120 parts per million, expressed as calcium carbonate. Cellulose acetate which has been freshly precipitated and the excess acetic acid removed by suitable means is washed for a period of 15–35 hours with this specially treated water. The resulting cellulose acetate, after drying, has a turbidity of 130–150, a hydrolytic stability of 12, and a heat stability of 100. This improvement in heat stability means approximately a gain of 10–15 centigrade degrees in heat stability over that of the cellulose acetate prepared according to Example I. The acetone solution of the cellulose acetate is brilliantly clear.

*Example III*

A similar procedure is followed as in Example I, except that in addition a small quantity of magnesium carbonate, for example 20 parts per million is fed to the water prior to sand-alum filtration. The treated water has an A. P. H. A. turbidity of 0.04–.30, a pH of 7–10, and an alkalinity of 100–120 parts per million expressed as calcium carbonate. The cellulose acetate prepared by washing with this water has a turbidity of 90–120, a hydrolytic stability of 10–15, and a heat stability of 100.

Although the wash water used in Examples I to III is ordinarily cold water, it may be heated a certain amount if desired.

It should be understood that I make a distinction between pH and alkalinity. By "pH" I seek to designate the concentration of hydrogen ions in the water. By the term "alkalinity", on the other hand, I seek to denote the specific titratable alkalinity of the water and, following the usual nomenclature of water treatment technology, is expressed as equivalent parts per million calcium carbonate, regardless of the nature of the alkalinity. Thus, the alkalinity may be increased to 150 parts per million of magnesium carbonate without materially changing the pH, provided a sufficient quantity of carbon dioxide is also added.

I measure the "hydrolytic stability" by the number of cc. of 0.1 normal sodium hydroxide necessary to neutralize the acidity which is set free when 100 grams of cellulose acetate are boiled under reflux for 3 hours with 1,400 cc. of distilled water. A hydrolytic stability of 10 is considered good, whereas 25 is definitely on the borderline of an inferior and undesirable grade of cellulose acetate.

I measure heat stability by comparison with the Hazen color standards customarily used in water analysis with the color of a 2.4% by weight acetone solution of cellulose acetate, said cellulose acetate having been submitted to a treatment consisting of hydrolyzing in contact with water on the steam bath for 3 hours, drying, and heating at 200° C. for 3 hours. In other words, the higher the numerical value, the lower the heat stability. That is, a heat stability of 100 is excellent, while 250 is passable, and 500 is considered definitely an inferior grade of cellulose acetate.

By the term "turbidity" of the cellulose acetate is indicated the measure of the Tyndall effect when light is passed through a 25% solution of cellulose acetate in a special solvent (dimethyl phthalate 25%, acetone 37.5%, alcohol 37.5%). The measurement is made by a Pulfrich photometer and Zeiss nephelometer, and all results are reported as absolute turbidity in whole numbers, the $10^{-4}$ being dropped. Thus, 123 is really $123\times10^{-4}$.

It will be readily recognized that the invention is equally applicable to other cellulose esters, such as cellulose propionate, cellulose butyrate, cellulose phthalate, and mixed cellulose esters, such as cellulose aceto-propionate, cellulose aceto-butyrate, and cellulose aceto-stearate.

While I prefer to secure the appropriate pH and alkalinity by doctoring the water with magnesium carbonate or calcium carbonate, still I may alternately employ other alkaline earth carbonates. Washing with a water containing calcium or other alkaline earth carbonates improves the heat stability to essentially the same extent as a magnesium carbonate-containing water, but the improvement in freedom from haze is not quite as marked. It will also be understood that bicarbonates and other like compounds of magnesium, calcium and other alkaline earths may be substituted for the carbonates. I wish to make clear that my invention does not include in its scope the addition of hydroxides, carbonates and bicarbonates of potassium, sodium and ammonium as my experiments up to the present have indicated that the addition of these alkali materials definitely decreases the hydrolytic and heat stability of the cellulose acetate.

Thus, if 25 parts per million of sodium bicarbonate are added prior to the sand-alum filtration, a water is produced which has an A. P. H. A. turbidity of 0.04–0.30, a pH of 7–9, and an alkalinity of 100–120 parts per million, expressed calcium carbonate. However, the cellulose acetate secured by washing with water prepared in this manner has a turbidity of 90–120, a poor hydrolytic stability of 25–50, and a poor heat stability of 500 or more.

I also prefer to add the alkaline earth carbonates to the water prior to the sand-alum filtration as any undissolved products are thereby removed and do not interfere later with the clarity of the cellulose acetate. However, the carbonates may be introduced at any suitable stage subsequent to the filtration if proper precautions are taken to see that the carbonates are dissolved and uniformly distributed throughout the wash water.

The clarification of the water may be conducted by methods other than treatment with aluminum sulfate and sand filtration. Thus, the minute colloidal organic and inorganic material may equally well be coagulated by addition of ferric sulphate and subsequently be removed from the water by filtration through a sand or charcoal filter.

Without wishing to be limited by theory, it is thought possible that the improvement of the cellulose acetate in freedom from haze by the use of a highly clarified wash water may be due to the removal from the water of ultra-microscopic inorganic and organic colloidal material by the clarification process which, while not being visible to the eye, still are attracted by the cellulose acetate and accumulate and agglomerate thereon during washing in sufficient amounts to produce haze. On the other hand, the improvement of the cellulose acetate in hydrolytic and heat stability may arise not only from the neutralization with magnesium carbonate of the acid group of any sulfoesters present but also to the presence of a small quantity of excess magnesium carbonate which instantly reacts with any hydrolyzed acetic acid which otherwise would accelerate the splitting of additional acetic acid from the cellulose acetate and starts a vicious cycle of further hydrolysis. In this connection, I have noted that the improvement in heat stability and hydrolytic stability arising from 0.01% of magnesium, calcium, or other alkaline earth carbonates being present uniformly throughout the cellulose acetate is secured substantially to the same extent by blending the solid alkaline earth carbonates with the solid cellulose acetate or by supplying a suspension of the carbonate on the cellulose acetate at the end of the washing operation.

The outstanding advantage of my invention is the production of a haze free cellulose acetate which is admirably suited for making haze free film which is highly desired by the safety glass and photographic film and like industries. A further advantage of the invention consists in the production of a cellulose acetate which is not only substantially free from haze but also possesses an improved stability toward hydrolysis and heat. The improvement in resistance to hydrolysis is a decided advantage inasmuch as any acetic acid split from the cellulose acetate promotes considerable corrosion of equipment employed in the conversion thereof into film, thread pastics and the like. The improvement in heat stability of approximately 10-20° is a decided advantage in safety glass for a discoloration from heat or any other source is highly undesirable, in photographic film which is exposed to the heat of a cinema projector, in plastics in which heat is frequently used in the production thereof, and in cellulose acetate fabrics in which it is desirable to have as high a safe ironing point as possible. It will also be obvious that the improvement in heat and hydrolytic stability of the cellulose acetate is a decided advantage in its preservation in an unchanged condition when exposed to extreme changes in atmospheric temperature and moisture during storage and during transportation to various localities.

Since the invention is susceptible of considerable modification, any variation from the procedure outlined in the above description which conforms to the spirit of the invention is intended to be included within the scope of the claims.

I claim:

1. The process of producing cellulose acetate adapted to yield haze-free products which comprises washing cellulose acetate with a wash water having an A. P. H. A. turbidity of below 0.9.

2. The process of producing cellulose acetate adapted to yield haze-free products which comprises washing cellulose acetate with a wash water having an A. P. H. A. turbidity of not in excess of 0.30.

3. The process of producing cellulose acetate adapted to yield haze-free products which comprises washing freshly precipitated cellulose acetate with a wash water having an A. P. H. A. turbidity of not in excess of 0.30 and containing an alkaline earth carbonate dissolved therein.

4. The process of producing cellulose acetate adapted to yield haze-free products which comprises washing freshly precipitated cellulose acetate with a wash water having an A. P. H. A. turbidity of not in excess of 0.30 and containing an alkaline earth carbonate dissolved therein in an amount yielding a pH of 7-9.

5. The process of producing cellulose acetate adapted for the production of haze-free products which comprises further purifying a sparkling water containing a small amount of suspended impurities until the water has an A. P. H. A. turbidity not in excess of 0.30, washing freshly precipitated cellulose acetate therewith and drying the cellulose acetate.

6. The process of claim 5 characterized in that an alkaline earth carbonate is introduced into the cellulose acetate.

7. The process of producing cellulose acetate adapted for the production of haze-free products which comprises further purifying a sparkling water containing a small amount of suspended impurities until the water has an A. P. H. A. turbidity not in excess of 0.30, washing freshly precipitated cellulose acetate therewith and drying the cellulose acetate then fabricating the cellulose acetate into sheeting.

FERDINAND SCHULZE.